J. W. RUSSELL.
Chuck.
No. 13,104.
Patented June 19, 1855.
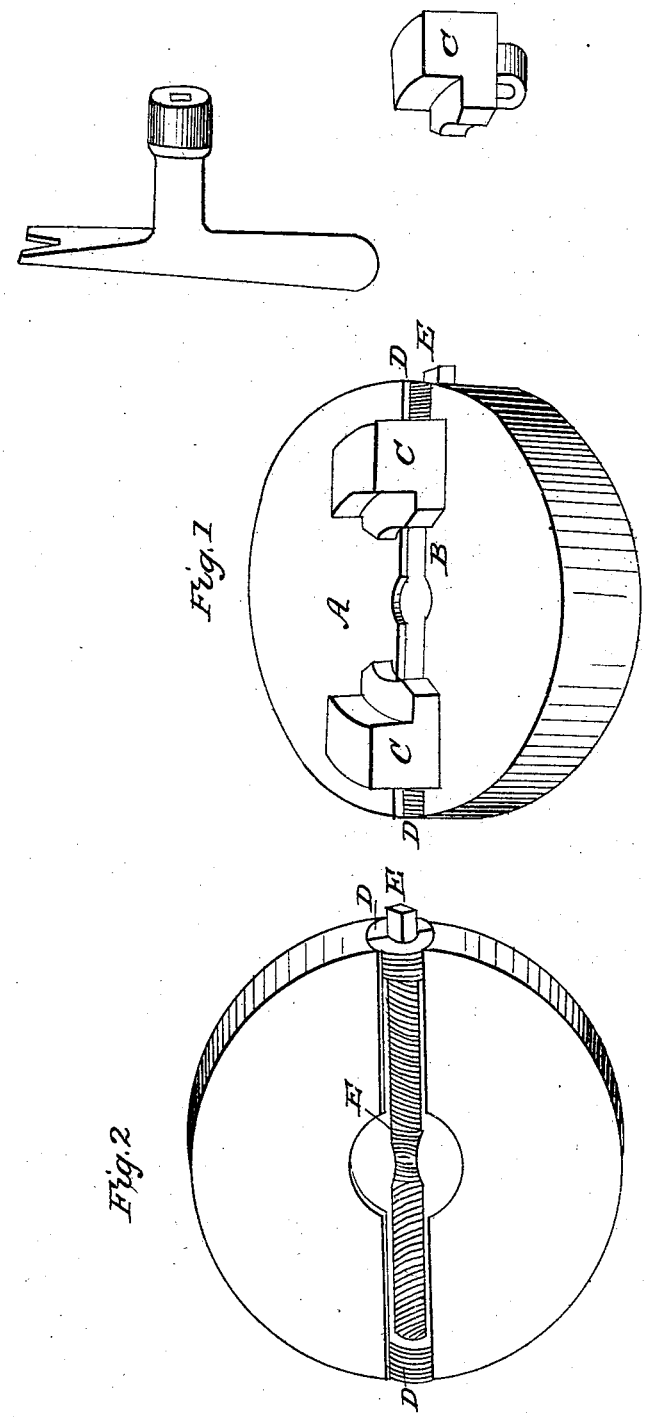

UNITED STATES PATENT OFFICE.

JOHN W. RUSSELL, OF SPRINGFIELD, MASSACHUSETTS.

CHUCK FOR TURNING ECCENTRICS.

Specification of Letters Patent No. 13,104, dated June 19, 1855.

*To all whom it may concern:*

Be it known that I, JOHN W. RUSSELL, of Springfield, in the county of Hampden and State of Massachusetts, have invented a new and Improved Chuck; and I do hereby declare the following to be a full and exact description of the construction and operation of the same, reference being had to the accompanying drawings and the letters of reference marked thereon.

The nature of my invention consists in a chuck with a movable center in addition to that of ordinary construction and made by the operation of two motor collars on the periphery of the chuck and between which and through which the right and left screw is operated.

A, Figure 1, represents the face of the chuck; B, the transverse groove in which the screw E is operated; C, the movable jaws; D, the nut or collars screwed into the periphery of the chuck and also acting as a collar to the right and left screw which passes through them. E is a right and left threaded screw on which the two jaws C, C, are opened or closed and lies in a deep transverse groove on the face of the chuck.

The point of improvement here gained is the application of the chuck to irregular objects and points eccentric from the center and this is done by simply starting one of the nuts and then the other to follow in the same direction as one may be taken out and then the screw and jaws follow when the jaws can be revolved on the screw to any point of deviation desired.

What I claim as my invention and desire to secure by Letters Patent is—

The application of a chuck to irregular objects and points eccentric from the center using for that purpose the jaws C, C, and the screw E in combination with the nuts or collars D, D, in all for the purposes substantially as herein set forth.

JOHN W. RUSSELL.

Witnesses:
B. HERFORD,
WILLIAM W. RAY.